Feb. 3, 1953  R. D. ARBOGAST  2,627,534
BATTERY WITH CONDUCTIVE CEMENT INTERCELL CONNECTIONS
Filed Dec. 16, 1948
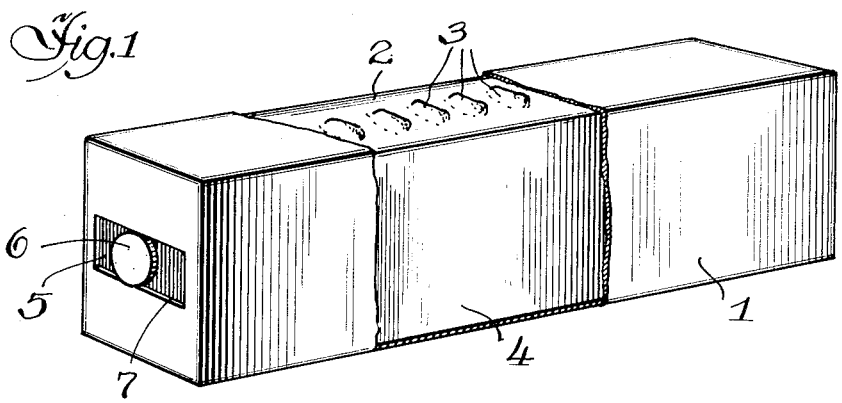
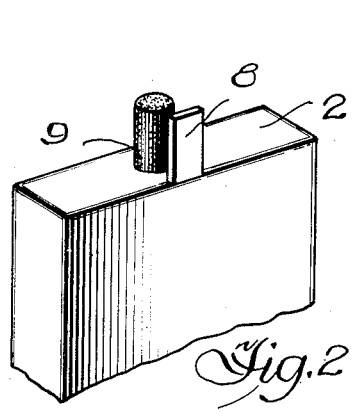
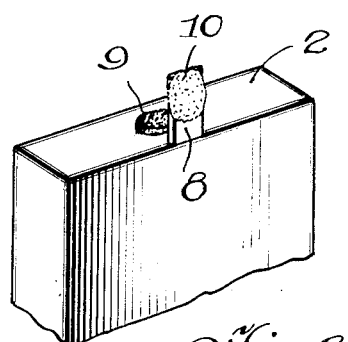
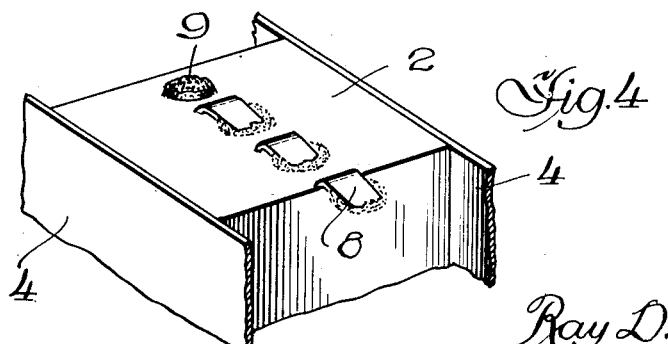
INVENTOR.
Ray D. Arbogast
BY
Tesch and Darbo Attys.

Patented Feb. 3, 1953

2,627,534

UNITED STATES PATENT OFFICE 2,627,534

BATTERY WITH CONDUCTIVE CEMENT INTERCELL CONNECTIONS

Ray D. Arbogast, Freeport, Ill., assignor, by mesne assignments, to Burgess Battery Company, Freeport, Ill., a corporation of Delaware Application December 16, 1948, Serial No. 65,600

4 Claims. (Cl. 136—175)

This invention relates to dry batteries and more particularly to the interconnection of the cells composing the battery by means of electrically conductive cement.

Electric dry batteries are composed of a plurality of individual dry cells electrically interconnected in parallel or in series at the individual cell terminals to produce a battery with the desired electrical characteristics. Flat, cylindrical, or other cell shapes may be employed. Each cell has two electrodes which must be connected with the electrodes of other cells as a step in the manufacture of the battery.

Soldering, as a method for electrically connecting circuit elements, has long been considered the preferable method of permanently connecting the parts. Except where pressure contact alone is relied upon to provide electrical connection between the terminals of adjacent cells, the almost invariable practice has been to solder intercell connecting wires or tabs to the terminals of the cells. This is a relatively troublesome and expensive operation which cannot always be accomplished by machine, and it has the additional disadvantage that the heat necessary to perform the soldering operation is detrimental to the cells.

The principal object of the invention is to provide a battery in which the internal electrical connections are made by means of an electrically conductive cement without the use of solder or other metal-fusion or heat-requiring method. A further object is to provide a battery having dependable internal connections which can be produced at substantially less cost by reason of the employment of the method of making such connections herein described.

Many advantages in addition to considerations of economy will be apparent to those skilled in the art of manufacturing dry batteries as the description of the invention proceeds.

In the accompanying drawing,

Fig. 1 is a perspective view of a battery embodying the invention and having a portion broken away to show the interior;

Fig. 2 is a perspective view of a portion of a single cell of the battery showing the terminals as they appear prior to commencement of the intercell connecting procedure;

Fig. 3 is a perspective view of a portion of a single cell at an intermediate stage of the procedure; and Fig. 4 is a perspective view of a portion of a battery showing the completed intercell connections.

The invention is applicable and useful in making internal connections of batteries composed of cells of any shape and employing any type of connecting elements. Its potential advantages are probably most completely enjoyed in the connection of the terminals of cells having a tab extending from one electrode to which the cement may be applied and which may then be bent to make the necessary connection. The cells illustrated in the drawing by way of example, are of the flat type; that is, each cell has a flat metallic electrode and a flat cake of mix, and the tab connectors are used.

The outer carton 1 of the battery illustrated in Fig. 1 is broken away to show the assembled battery unit, particularly the top of the battery block. Seal 2 is a continuous layer of thermoplastic sealing material of any suitable known composition. An additional coating or auxiliary seal covers humps 3 formed by the intercell connectors. The cells forming the battery block are contained in a suitably treated cardboard tray having sides 4. Seal 2 extends between the upper marginal portions of side walls 4 and adheres thereto. A suitable battery terminal plate 5 having an elevated contact portion 6 is provided at each end of the battery and a suitable opening 7 permits the contact area to protrude and thus be made accessible for connection into the external circuit.

The particular composition of the individual cells forms no part of this invention and the same is therefore described only to the extent necessary for a complete description and understanding of the invention. Each cell has a tab 8 of metal projecting above the top of the cell. This tab is preferably an integral part of a metallic electrode terminal. Being such, it is, of course, electrically connected to the electrode and it is not necessary to provide and attach a separate element to serve as a connector between cells. The other terminal of the cell is in the form of a carbon rod 9 which also projects from the top of the cell. Both tab 8 and carbon rod 9 are located approximately midway between the sides of the cell.

In assembling the battery, the desired number of cells are arranged in juxtaposition in a suitable cardboard tray which serves to keep them in line. These cells are completely assembled except that the tops have not yet been sealed. The cells are either individually wrapped in a suitable film material, leaving the tops open, or suitable insulating elements are placed between the cells to electrically separate them in the battery block. The block is then fastened together by tape or other suitable means and a seal is applied to the top of the group of cells, leaving the metal tab 8 and carbon rod 9 projecting above the seal.

After the seal has hardened, the carbon rods 9 are severed at approximately the surface of the seal as shown in Fig. 3. Preferably, the projecting portion of the rods are broken off to furnish an irregular surface at the top of the carbon terminal which provides an excellent base for the adherence of a cement as hereinafter more fully described.

An adherent electrical connection between the metal tab and the carbon terminal is made by means of an electrically conductive cement applied to the surfaces of these elements. A small mass of the fluid cement material is applied to the outer surface of tabs 8, as at 10, after which each tab is bent over upon the carbon terminal of the adjacent cell, thus bringing the cement into contact with the irregular surface of the carbon terminal. The mass of cement is permitted to set and the cells are thereby permanently electrically connected.

If desired, a second seal or protective coating may be applied over the exposed connecting elements by pouring an additional layer of fused thermoplastic sealing material over these parts or by spraying them with a suitable material.

The essential characteristics of a suitable electrically conductive cement which may be satisfactorily used in carrying out the method of this invention include sufficiently high electrical conductance and inertance to chemical change of any constituent which may, with time, result in increased electrical resistance of the material. While the material is herein referred to as a "cement," since good adherence is also desirable in most applications, this quality is not indispensible where the joined elements are otherwise held together. In general, adhesion of the cement to the terminal surfaces should be sufficient to insure a bond which will not fail when the battery is subjected to the jarring of the roughest use for which it is designed.

A suitable conductive composition may be prepared by suspending finely divided silver in a suitable vehicle. A resin dissolved in a suitable solvent or a cold-setting resin may be used as the vehicle. As a specific example of a suitable material for use in carrying out the invention, the following procedure may be employed in the preparation of an electrically conductive cement: A vehicle of polystyrene solution is prepared by dissolving polystyrene shavings in benzene in the proportions of approximately 35% by weight of polystyrene and 65% by weight of benzene. This gives a solution having the consistency of heavy molasses at room temperature. Equal proportions, by weight, of the solution thus prepared and precipitated silver powder are mixed. This mixture is then used in the manner described to cement the intercell connections together, its consistency being adjusted for most convenient use by adding additional quantities of benzene.

It will be understood that the utility of the invention is not limited to the connection of a metallic element to a carbon terminal, but is equally useful in connecting two metallic elements. Any suitable apparatus and method may be employed to apply the cement and to bring the parts to be joined together and to keep them together until the cement composition sets.

Invention is claimed as follows:

1. The method of making a dry battery from cells each having two terminals at the top thereof of at least one of which is a metallic terminal, which comprises arranging said cells in juxtaposition, applying a seal to the tops of the cells leaving the terminals exposed, applying an electrically conductive cement which is fluid at room temperature to a surface of the metallic terminals and while the cement is still fluid bending the metallic terminals to bring the surfaces thereof to which the cement has been applied into engagement with the terminals to be connected therewith.

2. The method of making a dry battery from unsealed cells each of which has a carbon terminal and a metallic terminal projecting from the top thereof, which comprises arranging said cells in juxtaposition, applying a seal to the tops of the collective cells, severing the carbon terminals at the tops of the cells, applying an electrically conductive cement which is fluid at room temperature to the projecting portions of the metallic terminals, and while the cement is still fluid bending the respective metallic terminals to bring the cement thereon into contact with the severed surfaces of the respective carbon terminals to be electrically connected therewith.

3. The method defined in claim 2 wherein the carbon terminals are severed at approximately the surface of the seal.

4. The method defined in claim 2 wherein the carbon terminals are severed by breaking off the portions thereof projecting from the tops of the cells.

RAY D. ARBOGAST.

REFERENCES CITED

The following references are of record in the file of this patent:

UNITED STATES PATENTS

| Number | Name | Date |
|---|---|---|
| Re. 22,301 | Pitman | Apr. 13, 1943 |
| 1,309,561 | Beaumont | July 8, 1919 |
| 1,594,810 | Benner et al. | Aug. 3, 1926 |
| 1,758,362 | Gillingham | May 13, 1930 |
| 2,134,870 | Fruth | Nov. 1, 1938 |
| 2,431,611 | Durst | Nov. 25, 1947 |
| 2,444,034 | Collings et al. | June 29, 1948 |
| 2,539,873 | Steinhoff | Jan. 30, 1951 |

FOREIGN PATENTS

| Number | Country | Date |
|---|---|---|
| 198,572 | Great Britain | June 7, 1923 |
| 307,684 | Great Britain | Mar. 14, 1929 |
| 817,741 | France | Sept. 9, 1937 |